(12) United States Patent
Dropps et al.

(10) Patent No.: US 7,894,348 B2
(45) Date of Patent: Feb. 22, 2011

(54) METHOD AND SYSTEM FOR CONGESTION CONTROL IN A FIBRE CHANNEL SWITCH

(75) Inventors: Frank R. Dropps, Maple Grove, MN (US); Gary M. Papenfuss, St. Paul, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 1131 days.

(21) Appl. No.: 10/894,732

(22) Filed: Jul. 20, 2004

(65) Prior Publication Data

US 2005/0018604 A1    Jan. 27, 2005

Related U.S. Application Data

(60) Provisional application No. 60/572,197, filed on May 18, 2004, provisional application No. 60/569,436, filed on May 7, 2004, provisional application No. 60/557,613, filed on Mar. 30, 2004, provisional application No. 60/550,250, filed on Mar. 4, 2004, provisional application No. 60/537,933, filed on Jan. 21, 2004, provisional application No. 60/532,965, filed on Dec. 29, 2003, provisional application No. 60/532,967, filed on Dec. 29, 2003, provisional application No. 60/532,966, filed on Dec. 29, 2003, provisional application No. 60/532,963, filed on Dec. 29, 2003, provisional application No. 60/505,381, filed on Sep. 23, 2003, provisional application No. 60/505,195, filed on Sep. 23, 2003, provisional application No. 60/505,075, filed on Sep. 23, 2003, provisional application No. 60/503,812, filed on Sep. 19, 2003, provisional application No. 60/504,038, filed on Sep. 19, 2003, provisional application No. 60/503,809, filed on Sep. 19, 2003, provisional application No. 60/504,950, filed on Sep. 19, 2003, provisional application No. 60/495,212, filed on Aug. 14, 2003, provisional application No. 60/495,165, filed on Aug. 14, 2003, provisional application No. 60/488,757, filed on Jul. 21, 2003.

(51) Int. Cl.
*H04J 3/14* (2006.01)

(52) U.S. Cl. ............... 370/236; 370/229; 370/230; 370/235

(58) Field of Classification Search ........... 370/235, 370/412, 429, 229, 230, 231, 236, 236.2, 370/463, 498, 535, 540, 232, 233, 234, 235.1, 370/236.1, 238, 237; 709/224, 223, 225, 709/226, 234, 235, 251
See application file for complete search history.

(56) References Cited

U.S. PATENT DOCUMENTS 4,081,612 A    3/1978   Hafner (Continued)

FOREIGN PATENT DOCUMENTS

EP    0649098    9/1994

(Continued)

OTHER PUBLICATIONS

"Office Action from USPTO dated Dec. 7, 2007 for U.S. Appl. No. 10/961,463".

(Continued)

*Primary Examiner*—Aung S Moe
*Assistant Examiner*—Abdullah Riyami
(74) *Attorney, Agent, or Firm*—Klein, O'Neill & Singh, LLP

(57) ABSTRACT

A method and system for routing fiber channel frames using a fiber channel switch element is provided. The switch element includes logic for comparing a credit counter value with a first threshold value to enable a credit limiting feature; and a first counter that receives a signal after a frame has departed from a transmit segment and maintains a maximum value for a certain duration that is based on the first threshold value. The method includes enabling a credit limiting feature, wherein frame transmission from a certain source is delayed when the credit limiting feature is enabled. The first counter is incremented every time a frame departs and holds its maximum value based on the threshold value. When the first counter is at the maximum value, a credit-limiting signal is used to enable the credit limiting feature by setting a control bit in a control register.

21 Claims, 12 Drawing Sheets

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,568,614 A | 10/1996 | Mendelson et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,638,518 A * | 6/1997 | Malladi | 709/251 |
| 5,666,483 A | 9/1997 | McClary | |
| 5,677,909 A | 10/1997 | Heide | |
| 5,687,172 A | 11/1997 | Cloonan et al. | 370/395 |
| 5,687,387 A | 11/1997 | Endejan et al. | |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,751,710 A | 5/1998 | Crowther et al. | |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,148,421 A * | 11/2000 | Hoese et al. | 714/50 |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,334,153 B2 | 12/2001 | Boucher et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry, Jr. et al. | 710/261 |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |

| Patent | Date | Inventor |
|---|---|---|
| 6,594,231 B1 | 7/2003 | Byham et al. |
| 6,597,691 B1 | 7/2003 | Anderson et al. .......... 370/360 |
| 6,597,777 B1 | 7/2003 | Ho |
| 6,606,690 B2 | 8/2003 | Padovano |
| 6,614,796 B1 | 9/2003 | Black et al. |
| 6,622,206 B1 | 9/2003 | Kanamaru et al. |
| 6,625,157 B2 | 9/2003 | Niu et al. |
| 6,629,161 B2 | 9/2003 | Matsuki et al. |
| 6,643,298 B1 | 11/2003 | Brunheroto et al. |
| 6,657,962 B1 | 12/2003 | Barri et al. |
| 6,684,209 B1 | 1/2004 | Ito et al. |
| 6,697,359 B1 | 2/2004 | George ....................... 370/357 |
| 6,697,914 B1 | 2/2004 | Hospodor et al. |
| 6,700,877 B1 | 3/2004 | Lorenz et al. |
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,765,871 B1 * | 7/2004 | Knobel et al. ............... 370/231 |
| 6,779,083 B2 | 8/2004 | Ito et al. |
| 6,785,241 B1 | 8/2004 | Lu et al. |
| 6,807,181 B1 | 10/2004 | Weschler |
| 6,816,492 B1 | 11/2004 | Turner et al. |
| 6,816,750 B1 | 11/2004 | Klaas |
| 6,859,435 B1 | 2/2005 | Lee et al. |
| 6,865,155 B1 | 3/2005 | Wong et al. |
| 6,865,157 B1 | 3/2005 | Scott et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 | 12/2005 | Parry et al. |
| 6,983,342 B2 | 1/2006 | Helenic et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,082,126 B2 | 7/2006 | Ain et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,570 B2 | 6/2007 | Gregg |
| 7,233,985 B2 | 6/2007 | Hahn et al. |
| 7,239,641 B1 | 7/2007 | Banks et al. |
| 7,245,613 B1 | 7/2007 | Winkles et al. |
| 7,245,627 B2 | 7/2007 | Goldenberg et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,275,103 B1 | 9/2007 | Thrasher et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,319,669 B1 | 1/2008 | Kunz et al. |
| 7,327,680 B1 * | 2/2008 | Kloth ........................ 370/235 |
| 7,334,046 B1 | 2/2008 | Betker |
| 7,346,707 B1 | 3/2008 | Erimli |
| 7,352,701 B1 | 4/2008 | Kunz |
| 7,352,740 B2 | 4/2008 | Hammons et al. |
| 7,362,702 B2 | 4/2008 | Terrell et al. |
| 7,366,100 B2 | 4/2008 | Anderson et al. |
| 7,397,788 B2 | 7/2008 | Mies et al. |
| 7,406,034 B1 | 7/2008 | Cometto et al. |
| 7,406,092 B2 | 7/2008 | Dropps et al. |
| 7,424,533 B1 | 9/2008 | Di Benedetto et al. |
| 7,443,794 B2 * | 10/2008 | George et al. .............. 370/231 |
| 7,447,224 B2 | 11/2008 | Dropps et al. |
| 7,460,534 B1 | 12/2008 | Bellenger |
| 7,466,700 B2 | 12/2008 | Dropps et al. |
| 7,471,691 B2 | 12/2008 | Black et al. |
| 7,492,780 B1 | 2/2009 | Goolsby |
| 7,646,767 B2 | 1/2010 | Dropps et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. .................. 370/392 |
| 2001/0043564 A1 | 11/2001 | Bloch et al. |
| 2001/0047460 A1 | 11/2001 | Kobayashi et al. |
| 2002/0016838 A1 * | 2/2002 | Geluc et al. ................. 709/224 |
| 2002/0034178 A1 | 3/2002 | Schmidt et al. |
| 2002/0067726 A1 | 6/2002 | Ganesh et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124102 A1 * | 9/2002 | Kramer et al. .............. 709/234 |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 * | 10/2002 | Susnow et al. ............. 370/229 |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0037159 A1 | 2/2003 | Zhao et al. |
| 2003/0046396 A1 | 3/2003 | Richter et al. |

| | | |
|---|---|---|
| 2003/0056000 A1 | 3/2003 | Mullendore et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0095549 A1 | 5/2003 | Berman |
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0152076 A1 | 8/2003 | Lee et al. |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0191883 A1 | 10/2003 | April |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0027989 A1* | 2/2004 | Martin et al. ............... 370/229 |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biran et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0088444 A1 | 5/2004 | Baumer |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ........................ 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153863 A1* | 8/2004 | Klotz et al. .................... 714/45 |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1* | 4/2005 | Moores et al. ............... 370/235 |
| 2005/0076113 A1* | 4/2005 | Klotz et al. .................. 709/224 |
| 2005/0088969 A1* | 4/2005 | Carlsen et al. ............... 370/229 |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0107260 A1 | 5/2006 | Motta |
| 2006/0143300 A1 | 6/2006 | See et al. |
| 2006/0184711 A1 | 8/2006 | Pettey et al. |
| 2006/0203725 A1* | 9/2006 | Paul et al. .................... 370/229 |
| 2006/0274744 A1 | 12/2006 | Nagai et al. |
| 2007/0206502 A1* | 9/2007 | Martin et al. ................ 370/235 |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |

OTHER PUBLICATIONS

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Deliver Server-Free Backup", *Pathlight & Computer Associates*, White Paper of Apr. 2000, Ithaca, New York, XP-002381153,1-8.

Naik, D., "Inside Windows Storage:Server Storage Technologies for Windows 2000, Windows Server 2003 and Beyond", *Addison-Wesley, US Chapter 5, XP-002381152*, (Jul. 15, 2003),137-173.

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

"Examination Report from the European Patent Office dated Oct. 12, 2007 for European Application No. 05 805 632.6".

"Office Action from USPTO dated Mar. 21, 2006 for U.S. Appl. No. 10/889,588".

"Office Action from USPTO dated Sep. 10, 2007 for U.S. Appl. No. 10/889,255".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
U.S. Appl. No. 10/266,360, filed Oct. 7, 2002, Method And System For Reducing Congestion In Computer Networks.
U.S. Appl. No. 10/241,153, filed Sep. 11, 2002, Zone Management In A Multi-Module Fibre Channel Switch.
U.S. Appl. No. 10/263,858, filed Oct. 3, 2002, Method And System For Using Distributed Name Servers In Multi-Module Fibre Channel Switching.
U.S. Appl. No. 10/212,425, filed Aug. 5, 2002, Method And System For Flexible Routing In A Fibre Channel System.
U.S. Appl. No. 10/302,149, filed Nov. 22, 2002, Method And System For Controlling Packet Flow In Networks.
U.S. Appl. No. 10/894,579, filed Jul. 20, 2004, Method and System for Managing Traffic in Fibre Channel Switches.
U.S. Appl. No. 10/894,546, filed Jul. 20, 2004, Method and System for Routing and Filtering Network Data Packets in Fibre Channel Systems.
U.S. Appl. No. 10/894,827, filed Jul. 20, 2004, Method and System for Selecting Virtual Lanes in Fibre Channel Switches.
U.S. Appl. No. 10/894,597, filed Jul. 20, 2004, Programmable Pseudo Virtual Lanes for Fibre Channel Systems.
U.S. Appl. No. 10/894,595, filed Jul. 20, 2004, Method and System for Reducing Latency and Congestion in Fibre Channel Switches.
U.S. Appl. No. 10/664,548, filed Sep. 19, 2003, Buffer to Buffer Credit Recovery for In-Line Fibre Channel Credit Extension Devices.
U.S. Appl. No. 10/895,175, filed Jul. 20, 2004, Method and System for Detecting Congestion and Over Subscription in a Fibre Channel Network.
U.S. Appl. No. 10/894,492, filed Jul. 20, 2004, LUN Based Hard Zoning in Fibre Channel Switches.
U.S. Appl. No. 10/894,587, filed Jul. 20, 2004, Multi Speed Cut Through Operation in Fibre Channel Switches.
U.S. Appl. No. 10/894,726, filed Jul. 20, 2004, Method and System for Improving Bandwidth & Reducing Idles in Fibre Channel Switches.
U.S. Appl. No. 10/894,629, filed Jul. 20, 2004, Method and System for Routing Fibre Channel Systems.
U.S. Appl. No. 10/894,491, filed Jul. 20, 2004, Method and System for Keeping a Fibre Channel Arbitrated Loop Open During Frame Gaps.
U.S. Appl. No. 10/894,536, filed Jul. 20, 2004, Method And System For Congestion Control Based On Optimum Bandwidth Allocation In A Fibre Channel Switch.
U.S. Appl. No. 10/894,627, filed Jul. 20, 2004, Method and System for Programmable Data Dependent Network Routing.
U.S. Appl. No. 10/719,077, filed Nov. 21, 2003, Method and System for Monitoring Events in Storage Area Networks.
U.S. Appl. No. 10/894,689, filed Jul. 20, 2004, Method and System for Power Control of Fibre Channel Switches.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method And System For Inexpensive And Non-Disruptive Data Capture In Networks.
U.S. Appl. No. 10/889,337, filed Jul. 12, 2004, Method And System For Minimizing Disruption In Common-Access Networks.
U.S. Appl. No. 10/889,259, filed Jul. 12, 2004, Method And Apparatus For Detecting And Removing Orphaned Primitives In A Fibre Channel Network.
U.S. Appl. No. 10/889,267, filed Jul. 12, 2004, Method And System For Fibre Channel Arbitrated Loop Acceleration.
U.S. Appl. No. 10/889,551, filed Jul. 12, 2004, Method And Apparatus For Testing Loop Pathway Integrity In A Fibre Channel Arbitrated Loop.
U.S. Appl. No. 10/889,256, filed Jul. 12, 2004, Method And Apparatus For Accelerating Receive-Modify-Send Frames In A Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method And Apparatus For Improving Buffer Utilization In Communication Networks.

U.S. Appl. No. 10/894,597, filed Jul. 20, 2004, Method And System For Using Extended Fabric Features With Fibre Channel Switch Elements.

U.S. Appl. No. 10/894,978, filed Jul. 20, 2004, Method And System For Programmable Data Dependent.

U.S. Appl. No. 10/894,917, filed Jul. 20, 2004, Method and System for Configuring Fibre Channel Ports.

U.S. Appl. No. 10/894,529, filed Jul. 20, 2004, Integrated Fibre Channel Fabric Controller.

U.S. Appl. No. 10/957,465, filed Oct. 1, 2004, Method and System for Using Boot Servers in Fibre Channel Network Routing.

U.S. Appl. No. 10/956,717, filed Oct. 1, 2004, Method and System for Transferring Data directly between storage devices in a Storage Area Networks.

U.S. Appl. No. 10/965,501, filed Oct. 1, 2004, High Speed Fibre Channel Switch Elements.

U.S. Appl. No. 10/965,502, filed Oct. 1, 2004, Method and System for LUN Remapping in Fibre Channel Networks.

U.S. Appl. No. 10/961,463, filed Oct. 8, 2004, Fibre Channel Transparent Switch For Mixed Switch Fabrics.

U.S. Appl. No. 10/956,718, filed Oct. 1, 2004, Method and System for Using an In-Line Credit Extender with a Host Bus Adapter.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al, "Virtual Channel Architecture", Presentation by Brocade to T11/03-369V0 dated Jun. 2, 2003.

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Jun. 25, 2008 for U.S. Appl. No. 10/895,175".

"Notice of Allowance from USPTO dated Jun. 25, 2008 for U.S. Appl. No. 10/894,491".

"Office Action from USPTO dated Jun. 27, 2008 for U.S. Appl. No. 10/894,726".

"Notice of Allowance from USPTO dated Jun. 27, 2008 for U.S. Appl. No. 10/956,717".

"Office Action from USPTO dated Jun. 26, 2008 for U.S. Appl. No. 10/894,547".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".

"Final Office Action from USPTO dated May 21, 2008 for U.S. Appl. No. 10/889,635".

"Final Office Action from USPTO dated Jun. 4, 2008 for U.S. Appl. No. 10/894,978".

"Final Office Action from USPTO dated Jun. 5, 2008 for U.S. Appl. No. 10/889,267".

"Final Office Action from USPTO dated Jun. 10, 2008 for U.S. Appl. No. 10/894,586".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Final Office Action from USPTO dated Nov. 13, 2008 for U.S. Appl. No. 10/894,587".

"Office Action from USPTO dated Nov. 13, 2008 for U.S. Appl. No. 10/894,917".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Office Action from USPTO dated Dec. 23, 2008 for U.S. Appl. No. 10/798,468".

"Notice of Allowance from USPTO dated Dec. 30, 2008 for U.S. Appl. No. 11/037,922".

"Final Office Action from USPTO dated Jul. 9, 2008 for U.S. Appl. No. 10/894,917".

"Notice of Allowance from USPTO dated Jul. 9, 2008 for U.S. Appl. No. 10/894,629".

"Notice of Allowance from USPTO dated Jul. 9, 2008 for U.S. Appl. No. 10/894,579".

"Notice of Allowance from USPTO dated Jul. 17, 2008 for U.S. Appl. No. 10/894,536".

"Office Action from USPTO dated Jul. 25, 2008 for U.S. Appl. No. 10/894,827".

"Office Action from State Intellectual Property Office (SIPO) of China for Chinese application 200580032889.0".

"Notice of Allowance from USPTO dated Aug. 18, 2008 for U.S. Appl. No. 10/889,259".

"Final Office Action from USPTO dated Aug. 20, 2008 for U.S. Appl. No. 10/798,468".

"Office Action from USPTO dated Sep. 18, 2008 for U.S. Appl. No. 10/894,978".

"Office Action from USPTO dated Sep. 23, 2008 for U.S. Appl. No. 12/031,585".

"Notice of Allowance from the USPTO dated Sep. 29, 2008 for U.S. Appl. No. 10/889,267".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Notice of Allowance from USPTO dated Oct. 8, 2008 for U.S. Appl. No. 10/889,255".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Jan. 21, 2009 for U.S. Appl. No. 10/894,827".

"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Office Action from China State Intellectual Property Office dated Dec. 11, 2009 for Chinese Application No. 200580032948.4".
"Office Action from USPTO dated Jan. 6, 2010 for U.S. Appl. No. 10/956,501".
"Office Action from State Intellectual Property Office dated Dec. 4, 2009 for Chinese Application No. 200580032947.X".
"Notice of Allowance from USPTO dated Jan. 21, 2010 for U.S. Appl. No. 10/894,547".
"Office Action from USTPO dated Jan. 26, 2010 for U.S. Appl. No. 10/956,501".
"Final Office Action from USPTO dated Mar. 4, 2010 for U.S. Appl. No. 10/957,465".
"Office Action from USPTO dated Mar. 29, 2010 for U.S. Appl. No. 12/189,502".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application No. 200580032948.4".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
"Notice of Allowance from USPTO dated Jul. 19, 2010 for U.S. Appl. No. 10/894,546".
"Final Office Action from USPTO dated Aug. 16, 2010 for U.S. Appl. No. 10/956,501".
"Notice of Allowance from USPTO dated Aug. 18, 2010 for U.S. Appl. No. 10/957,465".
"Notice of Allowance from USPTO dated Aug. 19, 2010 for U.S. Appl. No. 12/267,188".
"Notice of Allowance from USPTO dated Aug. 18, 2010 for U.S. Appl. No. 12/191,890".
"Office Action from USPTO dated Sep. 23, 2010 for U.S. Appl. No. 12/476,068".
"Office Action from USPTO dated Oct. 7, 2010 for U.S. Appl. No. 12/473,150".
"Office Action from USPTO dated Oct. 7, 2010 for U.S. Appl. No. 12/432,168".
"Office Action from USPTO dated Oct. 28, 2010 for U.S. Appl. No. 12/189,502".
Banks, David C., et al., "Link Trunking And Measuring Link Latency In Fibre Channel Fabric", U.S. Appl. No. 60/286,046, 1-52, Apr. 23, 2001.
Curtis, A. R., "Design Considerations for 10-Gbit Fibre Channel", Curtis A. Ridgeway, *Distinguished I/O Architect, Storage and Computing ASIC's Division, LSI Logic Corp.*, Apr. 14, 2001.
Malavalli, Kumar, "High Speed Fibre Channel Switching Fabric Devices", *Proceedings of the SPIE, SPIE*, Bellingham, VA, USA vol. 1577, XP000562869, ISSN: 0277-786X,(Sep. 4, 1991),216-226.
Melhem, et al., "Minimizing Wavelength Conversions In WDM Path Establishment", *Computer Science Department, University of Pittsburgh*, Pittsburgh, PA 15260, (2001),197-211.
Ridgeway, Curt, "0GFC-40GFC using 4-lane XAUI's", *LSI Logic Presentation—T11/03-069v0*, Feb. 3, 2003.
"Notice of Allowance from USPTO dated Dec. 17, 2010 for U.S. Appl. No. 12/473,150".

\* cited by examiner

METHOD AND SYSTEM FOR CONGESTION CONTROL IN A FIBRE CHANNEL SWITCH

CROSS REFERENCE TO RELATED APPLICATIONS

This application claims priority under 35 U.S.C.§119(e)(1) to the following Provisional Patent Applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495, 165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to congestion control by using a credit-limiting feature for frame transmission in a fibre channel switch.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre Channel switch fabrics can have arbitrary topologies and a mixture of frame traffic where frame source (s) and destinations operate at different speeds. Quality of service and congestion management is desirable to optimize switch performance.

In Fibre Channel, buffer-to-buffer credit mechanism is used to control frame flow on a Fibre Channel link to prevent the inability to deliver any frames because of lost R_RDYs or lost frames. The R_RDY primitive is used to indicate whether a receive port has credit to receive frames.

FIG. 2 illustrates the congestion problem in conventional fibre channel switches. In FIG. 2, Host 201 sends data to target 207 and host 202 sends data to target 208, via switches 203 and 206 having ports 204 and 205. Target 208 link operates at 1 gigabit/second and all other links operate at higher rates (for example, 2 Gb/S, 4 Gb/S, 8 Gb/S or 10 Gb/s.

If both host 201 and 202 send data as fast as they can, then eventually all receive buffers in port 205 will get filled up with frames destined for target 208, which in this example operates at the slowest speed compared to the other links. Hence port 204 will not be able to transmit at its bandwidth and cause congestion in the overall system.

The present fibre channel switches and standard do not provide a mechanism where "available credit" can be used for congestion control and for managing frame flow within a Fabric. Therefore, there is a need for a system and method that allows congestion control based on available credit or "credit limitations".

SUMMARY OF THE PRESENT INVENTION

In one aspect of the present invention, a method for routing fibre channel frames using a fibre channel switch element is provided. The method includes enabling a credit limiting feature, wherein frame transmission from a certain source is delayed when the credit limiting feature is enabled.

A credit counter value is compared to a threshold value and the comparison is used to enable the credit-limiting feature. A counter is incremented every time a frame departs and holds its maximum value based on the threshold value. When the counter is at the maximum value, a credit-limiting signal is used to enable the credit limiting feature by setting a control bit in a control register.

In another aspect of the present invention, a method for routing fibre channel frames using a fibre channel switch element is provided. The method includes, determining if a credit limiting feature is enabled; incrementing (increasing) a counter value after a R_RDY is received when a frame departs; comparing the counter value with a threshold value; and blocking frame transmission from a particular source based on the comparison between the counter value and the threshold value.

A control bit from a control register enables the credit limiting feature. The counter value increments if a VC_RDY is received. Also, the threshold value is programmed in a register.

In another aspect of the present invention, a fibre channel switch element for routing fibre channel frames. The switch element includes logic for comparing a credit counter value with a first threshold value to enable a credit limiting feature; and a first counter that receives a signal after a frame has departed from a transmit segment and maintains a maximum value for a certain duration that is based on the first threshold value.

The switch element further includes logic for generating a credit limiting signal to set a control bit value that enables the credit limiting feature; a blocking counter that maintains a count for a number of R-RDYs that are received after a frame has departed; and logic for comparing the blocking counter value with a second threshold value and generating a signal for blocking frame transmission from a particular source port based on the comparison.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard, incorporated herein by reference in its entirety, describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.—Port or F.Sub.—Port.

"L_Port": A port that contains Arbitrated Loop functions associated with the Arbitrated Loop topology.

"N-Port": A direct fabric attached port.

"NL_Port": A L_Port that can perform the function of a N_Port.

"R_RDY": Flow control primitive signal used for establishing credit. Receiving an R_RDY frame increases credit, while sending a R_RDY frame decreases credit.

"Switch": A fabric element conforming to the Fibre Channel Switch standards.

"VL" (Virtual Lane (or Channel)): A dedicated portion of the data path between a source and destination port each having independent buffer to buffer flow control.

"VC_RDY": Primitive for establishing credit if the switch uses virtual lanes.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
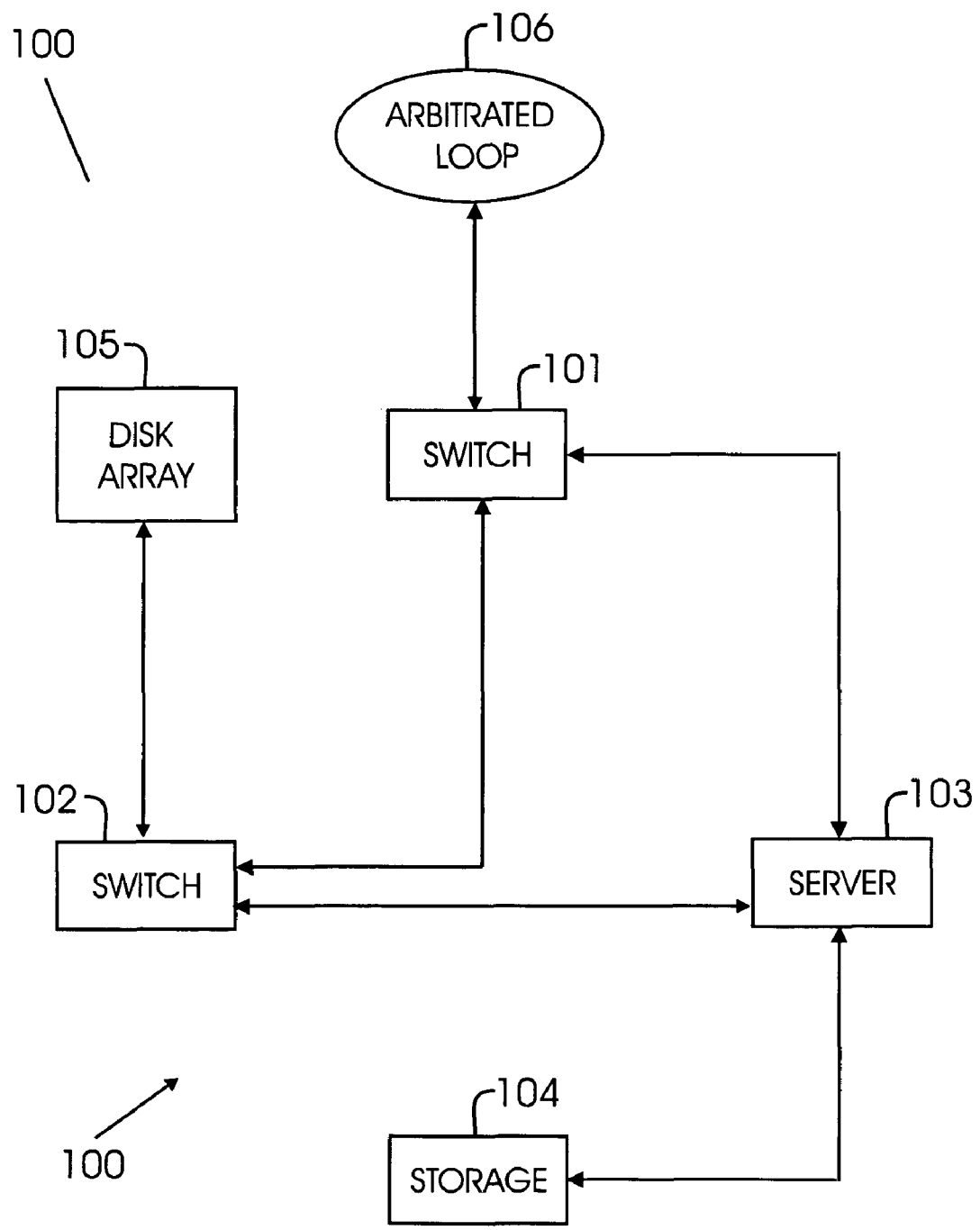
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
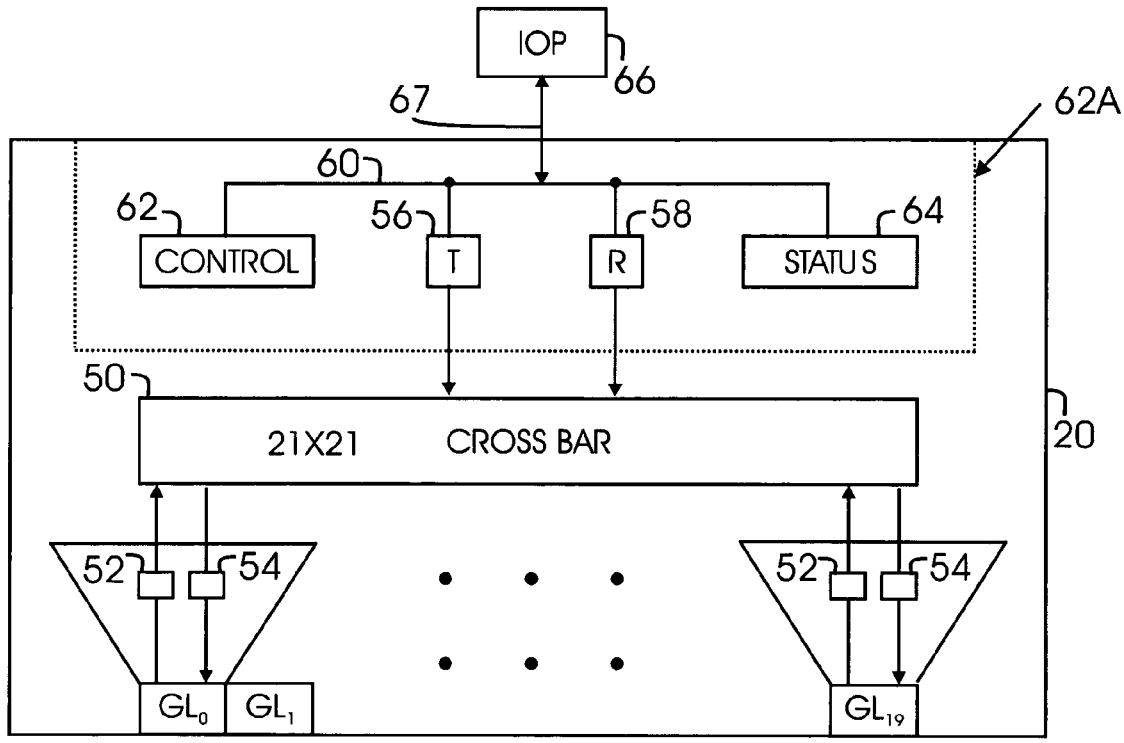
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
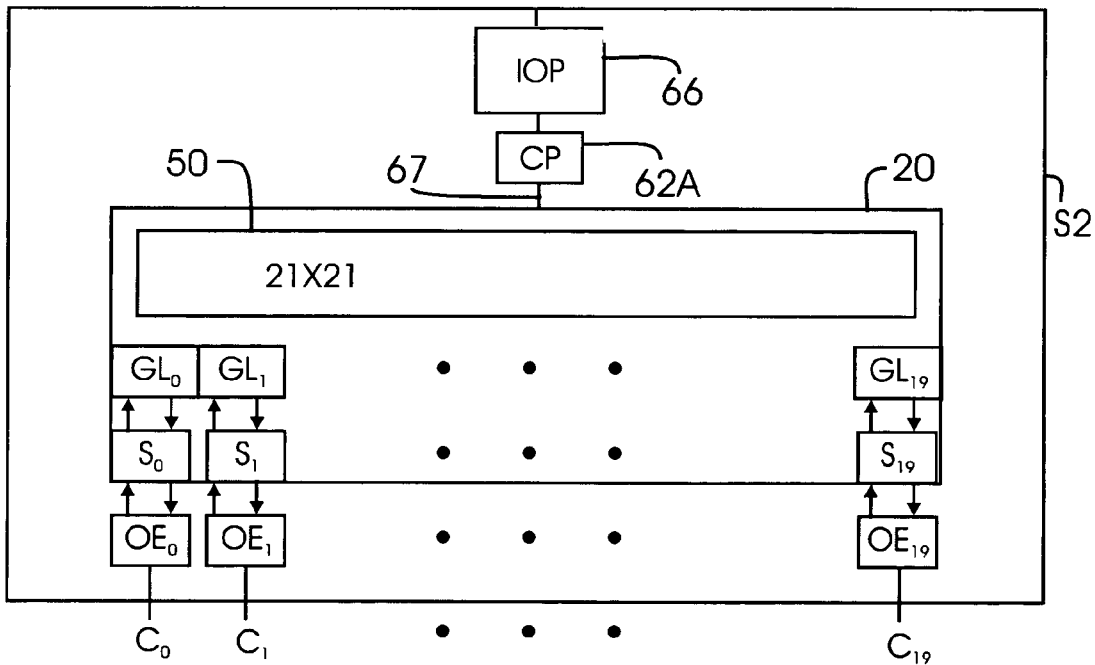
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
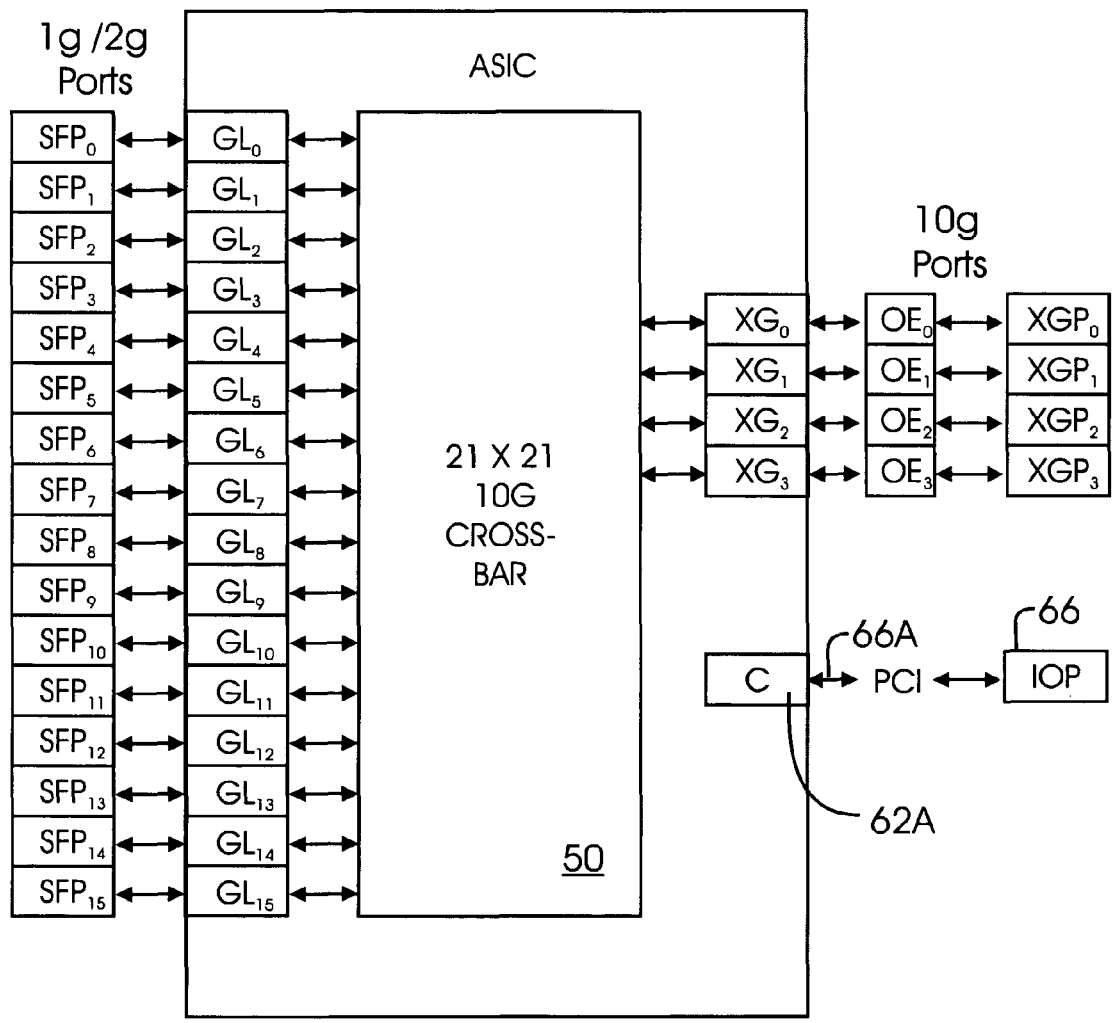
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figures 1, 1E:
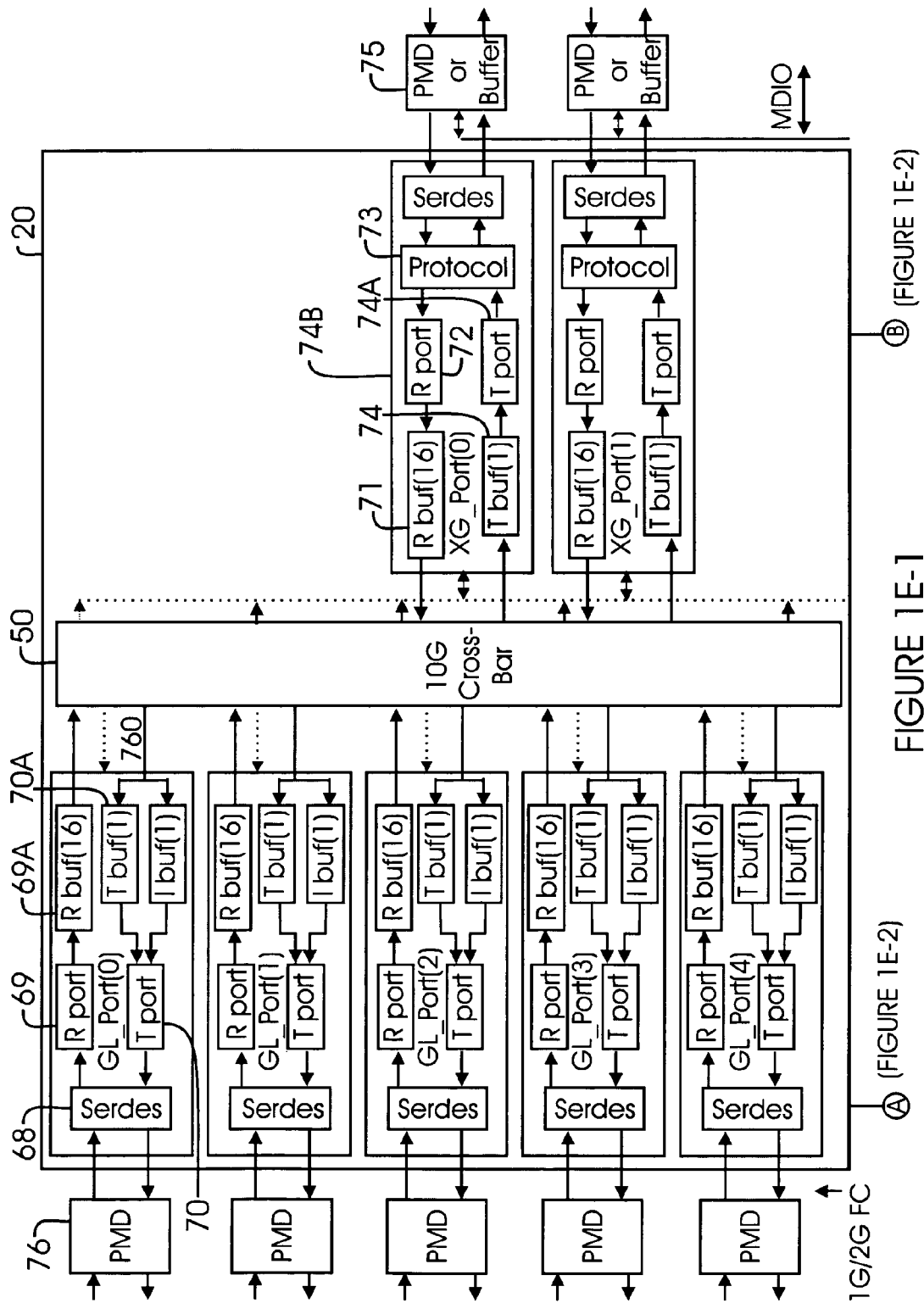
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
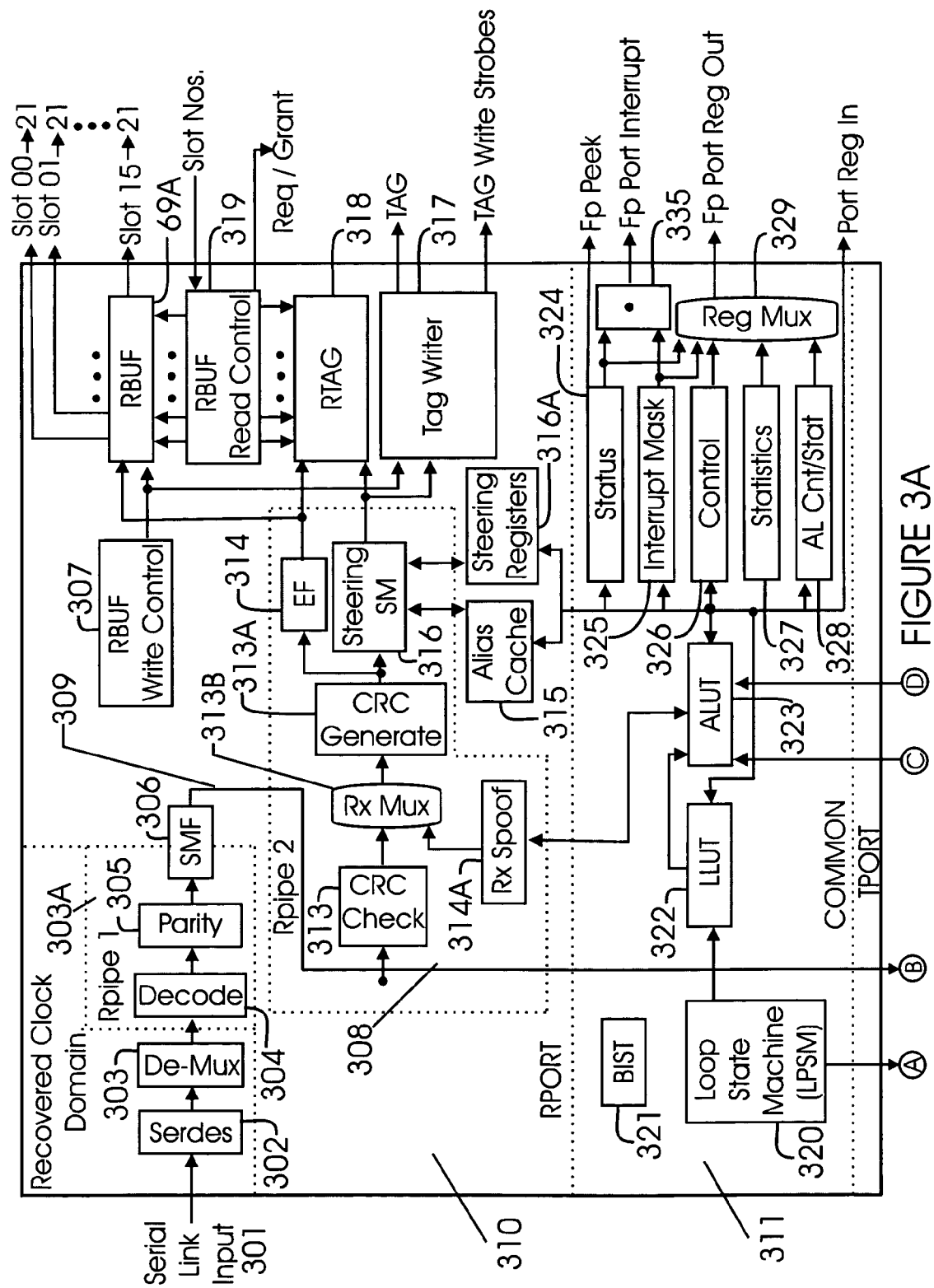
FIGS. 3A/3B (jointly referred to as FIG. 3) show a block diagram of a GL_Port, according to one aspect of the present invention.
Figure 3B:
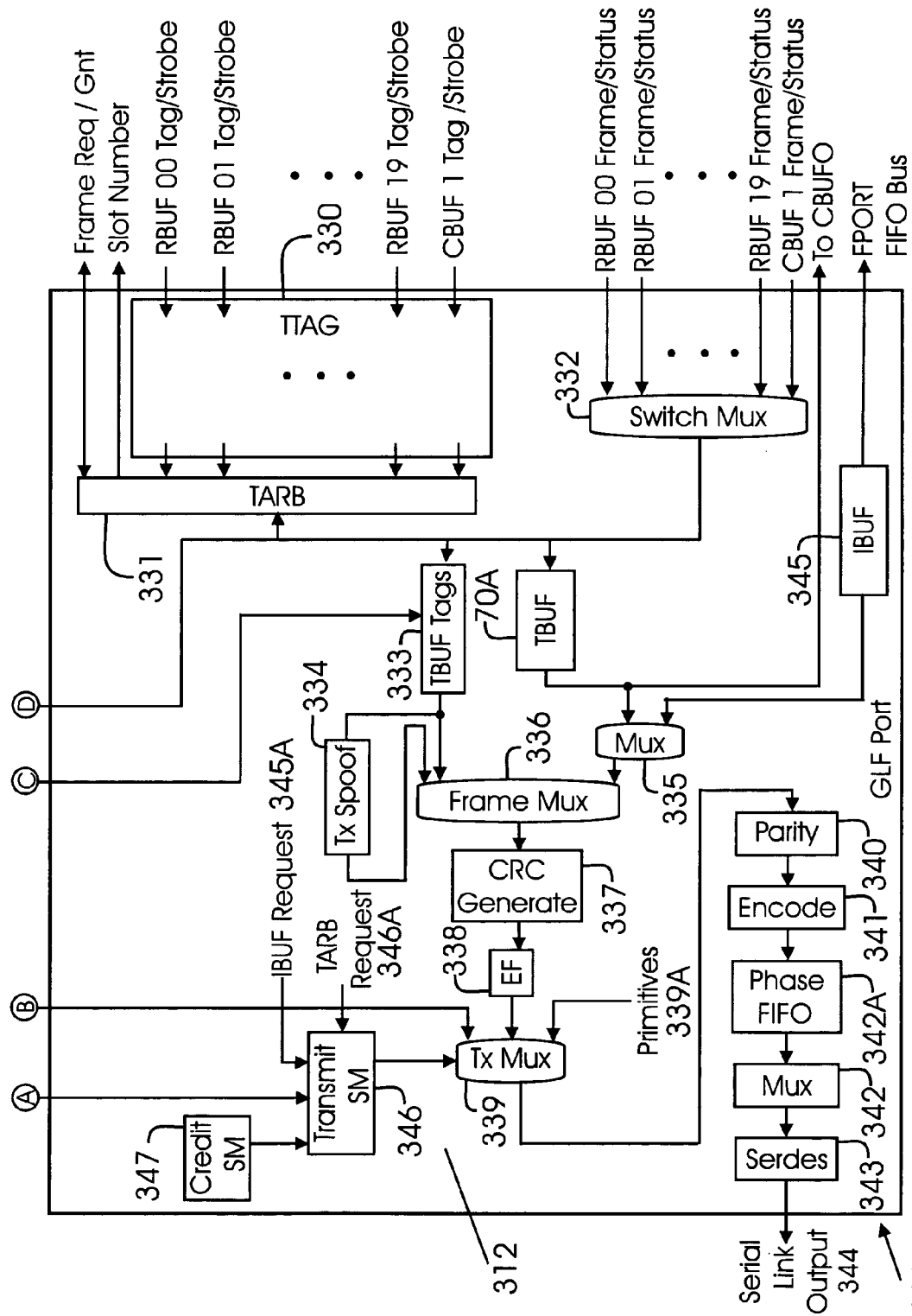

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" (may also be shown as "Rpipe1" or "Rpipe2")) 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF_module 314 encodes proprietary (i.e. non-standard) format frames to standard Fibre Channel 8B codes. Mux 313B receives input from Rx Spoof module 314A, which encodes frames to an proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMux") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
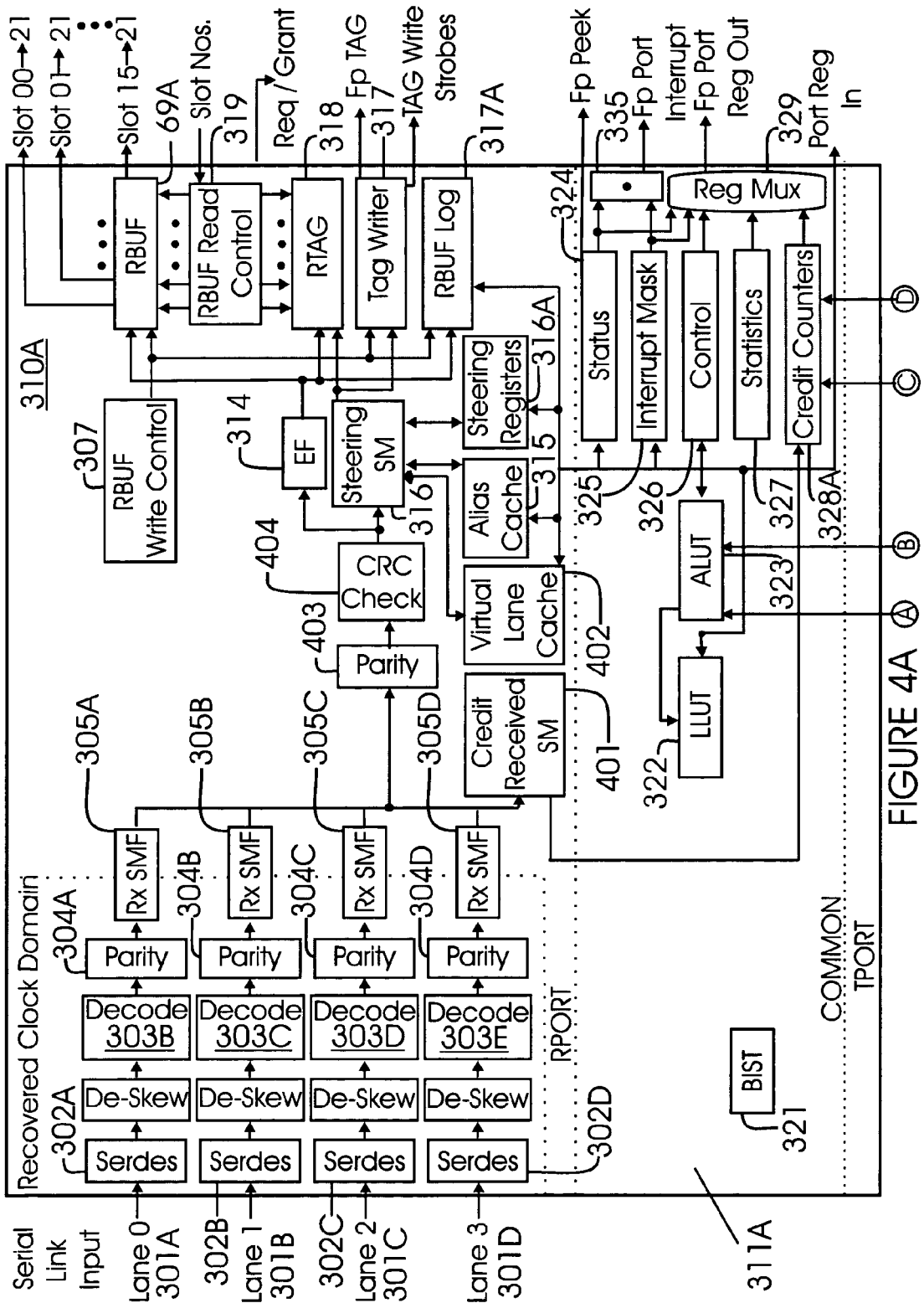
FIGS. 4A/4B (jointly referred to as FIG. 3) show a block diagram of XG_Port (10 G) port, according to one aspect of the present invention.
Figure 4B:
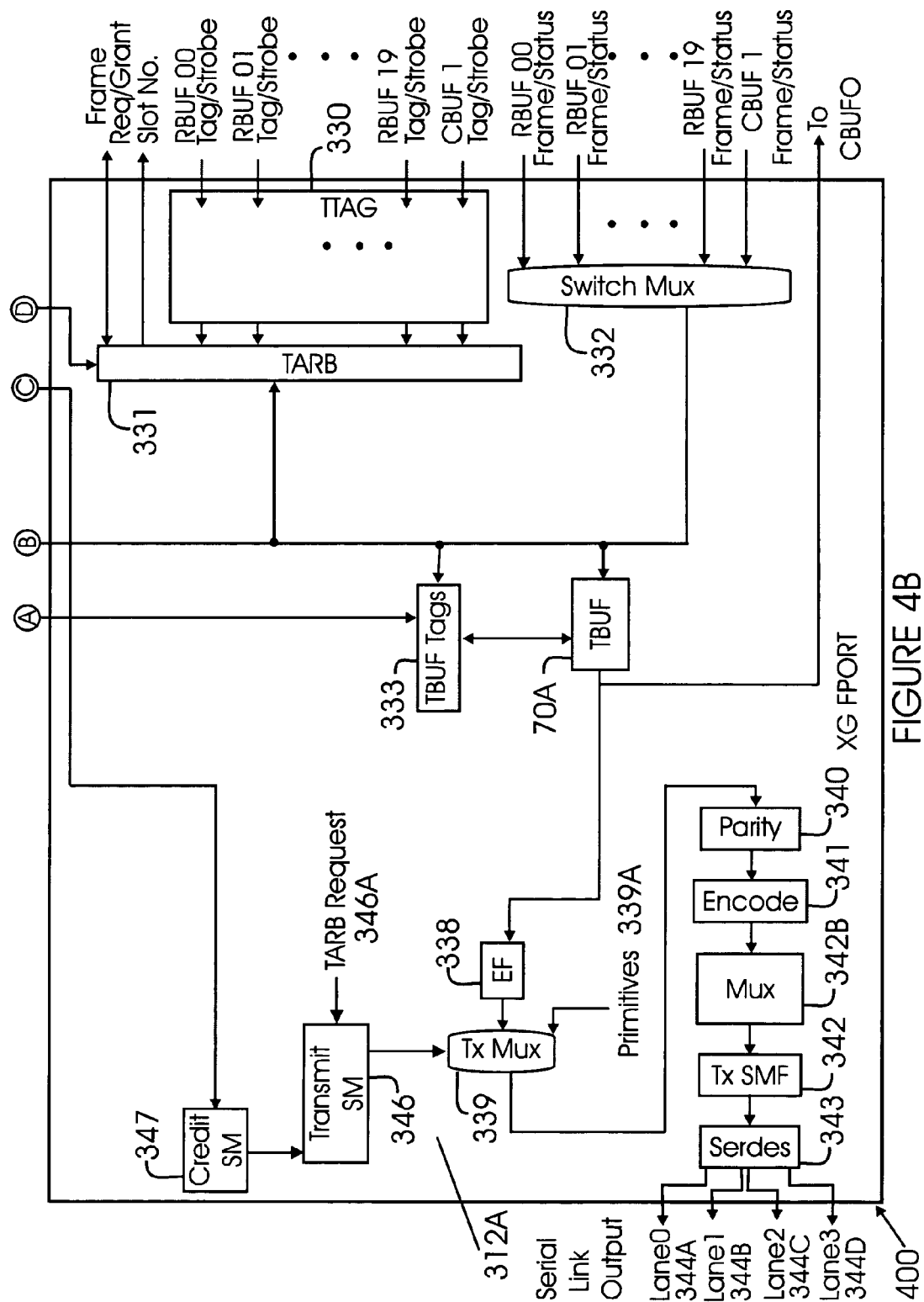

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing FIFO ("TxSMF") module 342 that handles clock variation on the transmit side. SERDES 343 then sends the data out to the link.

Credit Limiting Feature:

In one aspect of the present invention, a transmit queue in TTAG 330 (in TPORT 311A and/or 311) uses a Quality of Service (QOS) register 512 (FIG. 5) that can be programmed by IOP 66 to enable frame transmission based on the innovative credit limiting feature of the present invention. When used for credit limiting, QOS register 512 can be programmed with the number of R_RDY signals each queue has to wait to be received after transmitting two frames.

Figure 5:
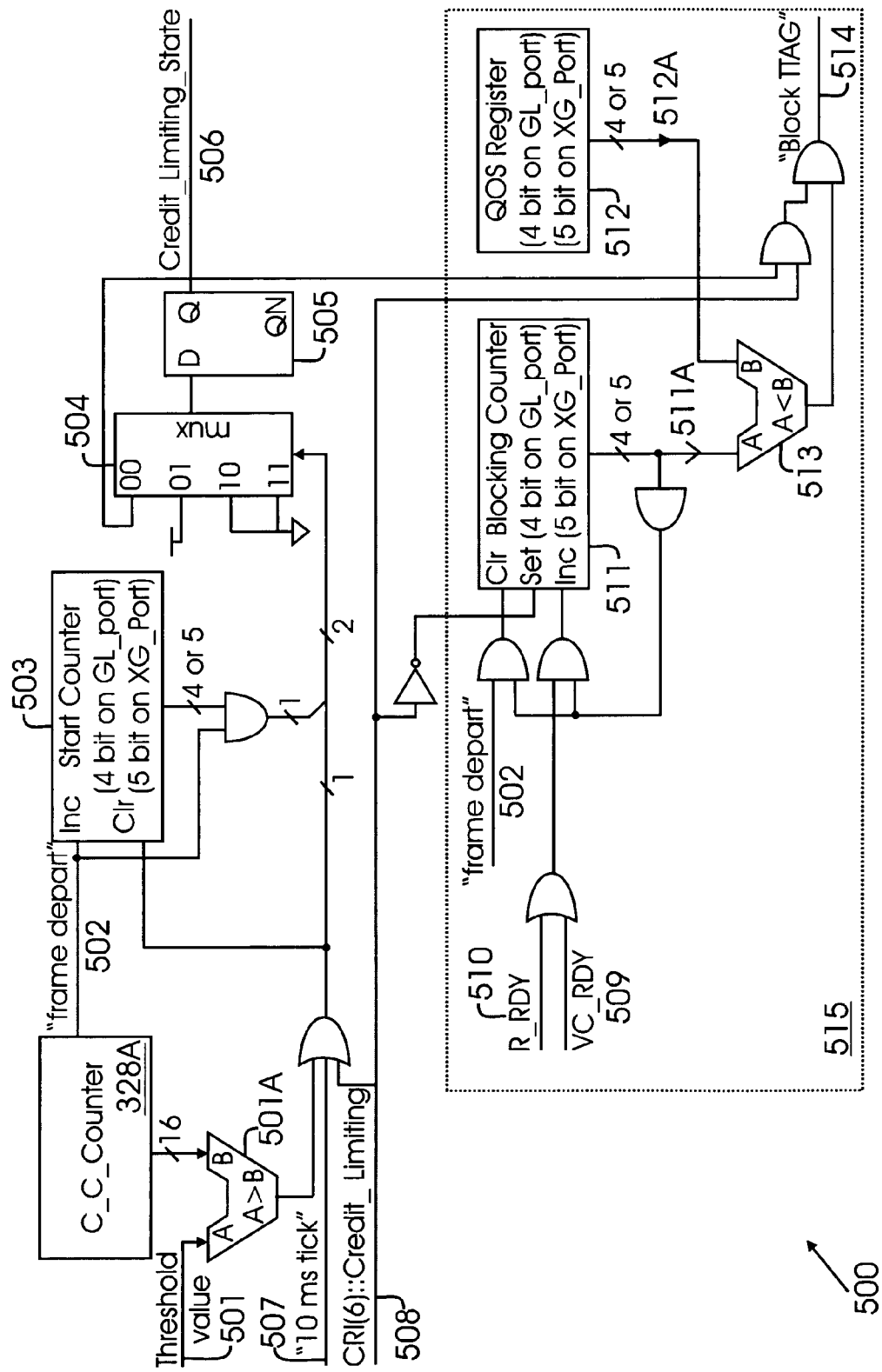
FIG. 5 shows a schematic for generating and using the credit limiting feature, according to one aspect of the present invention.

FIG. 5 shows a schematic of logic 500 that is used for using credit limitation as a parameter to avoid frame congestion in a fibre channel switch. Logic 500 is to illustrate the adaptive aspects of the present invention and not to limit the present invention to the logic scheme of FIG. 5.

Credit counter 328A counts the number of credits that are outstanding without receiving a corresponding R_RDY 510. The value of credit counter 328A at a given time is compared by logic 501A to threshold value 501, for example, "0003". If the counter 328A value is greater than or equal to the threshold value 501, then the result is used to enable the "credit limiting" feature of the present invention. This feature may be cleared by using signal 507 at a pre-determined time interval, for example, 10 milli-seconds, as shown in FIG. 5. It is noteworthy that the present invention is not limited to any particular time interval.

Routing frames using the credit-limiting feature is enabled by setting a bit 508 in control register 326 and using a start counter 503 that counts when a frame departs based on input 502. The start counter 503 increments to its maximum value, and hold this maximum value for as long as the threshold value 501 comparison permits. With the start counter at the maximum value, logic 504 and 505 are used to generate a "Credit_Limiting_State" signal 506 that enables the use of "credit limiting" for frame transmission. Based on signal 506, the credit_limiting bit 508 is set in control register 326, which enables logic 515 to block frame transmission at a port, based on available credit (i.e. "credit limiting" feature). Logic 515 exists for each source FIFO in TTAG 330.

Blocking counter 511 receives bit 508 from control register 326, frame depart signal 502 and counts the number of R_RDYs 510 or VC_RDYs 509 that are received by the port, since the last frame that was sent by the port. Counter 511 increments when a R_RDY 510 (or VC_RDY 509) is received (unless the counter is at its maximum value) and cleared based on input 502/and when the counter is at its maximum value.

QOS register 512 can be programmed with a particular threshold value 512A. This threshold value 512A includes the number of R_RDYs 510 a port should receive after sending a frame from that source FIFO, before the next frame can be sent from the same FIFO. Threshold value 512A is compared by logic 513 with counter value 511A. If counter value 511A is greater than or equal to QOS register value 512A, then the frame is sent. If the counter value 511A is less than QOS register value 512A then a "block TTAG" signal 514 is generated that blocks frame transmission from that source FIFO.

It is noteworthy that counter 511 is not limited to being an incrementing counter with a "reset". Counter 511 may be set to QOS register value 512A when a frame is sent and is decremented when an R_RDY is received, unless the counter value 511A is zero. In this case frames can be sent when counter 511 is at zero (i.e. transmit credit is at its maximum).

It is noteworthy that if virtual lanes are used, then VC_RDYs 509 are processed the same way as R_RDY 510.

Figure 6:
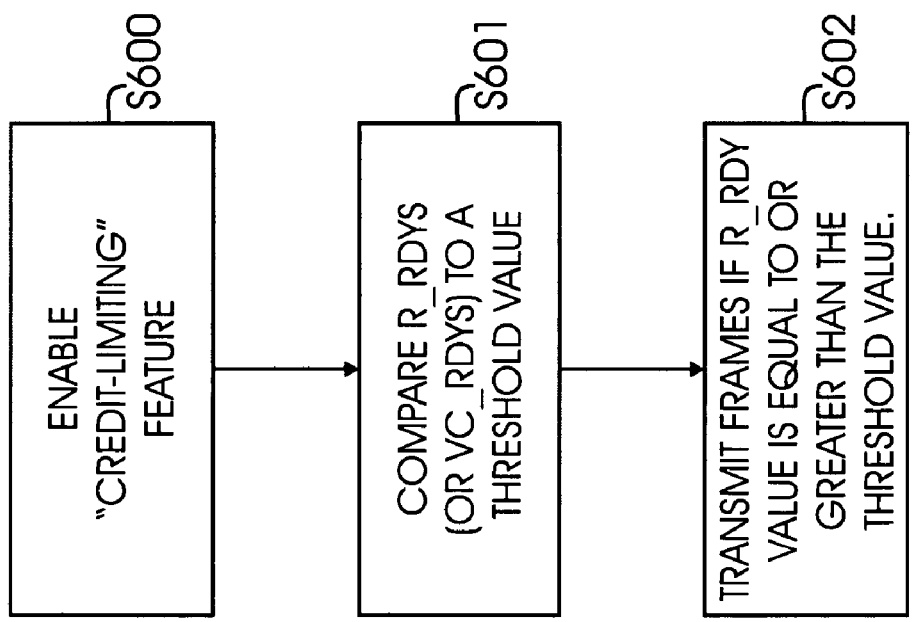
FIG. 6 shows a flow diagram of executable steps for routing frames using the credit-limiting feature, according to one aspect of the present invention.

Process Flow:

FIG. 6 shows a process flow diagram by using the credit-limiting feature to reduce congestion in a Fibre Channel system. Turning in detail to FIG. 6, in step S600, the process enables the "credit-limiting" feature. As discussed above, this may be achieved by setting a bit 508 in control register 326. This feature is enabled when congestion is detected at a port.

In step S601, the process compares received R_RDY 510 (or VC_RDY 509) value (511A) with a programmed threshold value 512A. If the counter value is equal or greater than threshold value 512A, then in step S602, the frames are transmitted, or otherwise the frames are blocked.

As discussed above, the process for handling R_RDYs and VC_RDYs is the same.

Figures 1, 1E, 2:
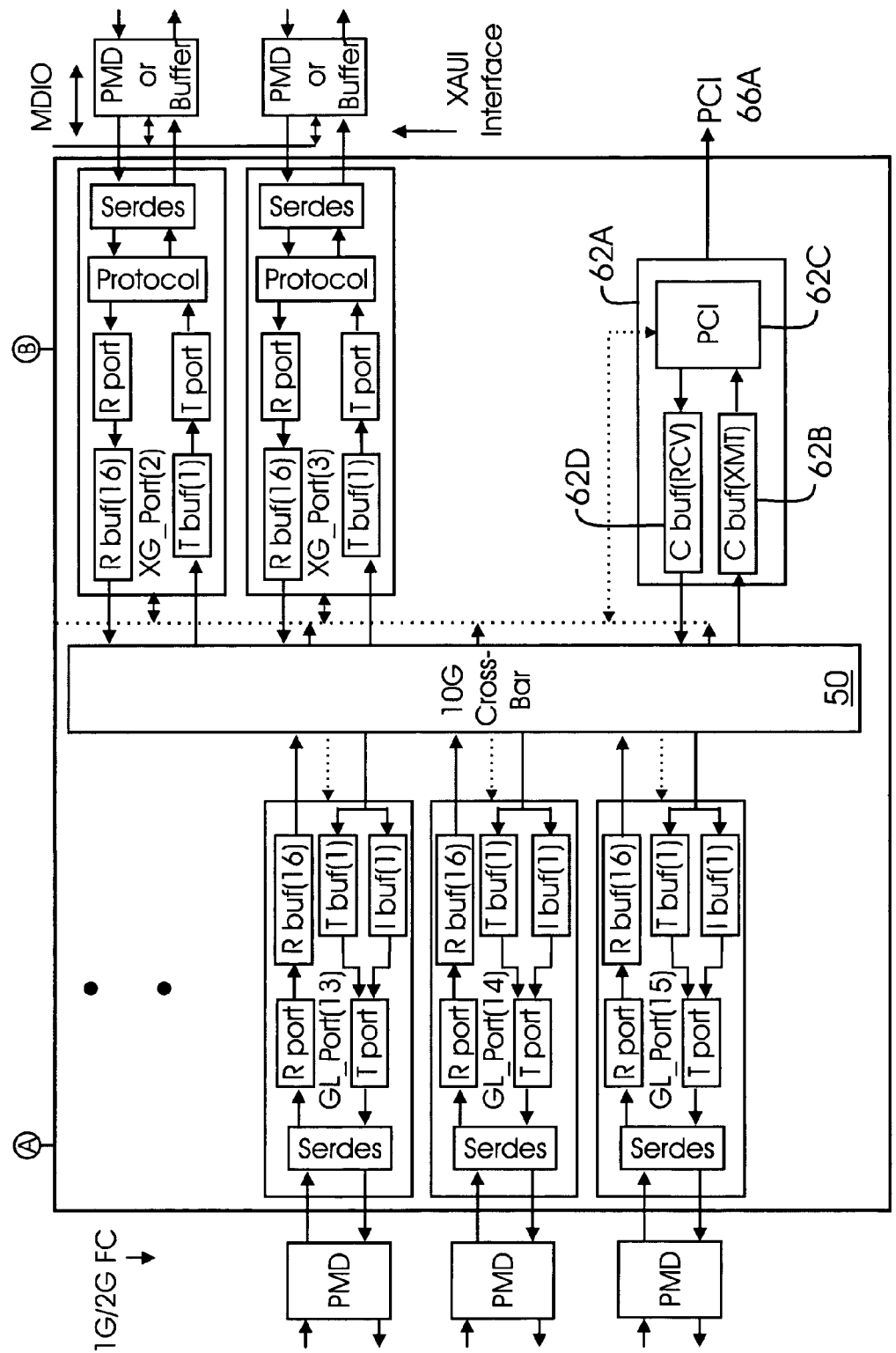
FIG. 2 shows an example of an architecture, which can use the credit-limiting feature, according to one aspect of the present invention.
Figure 2:
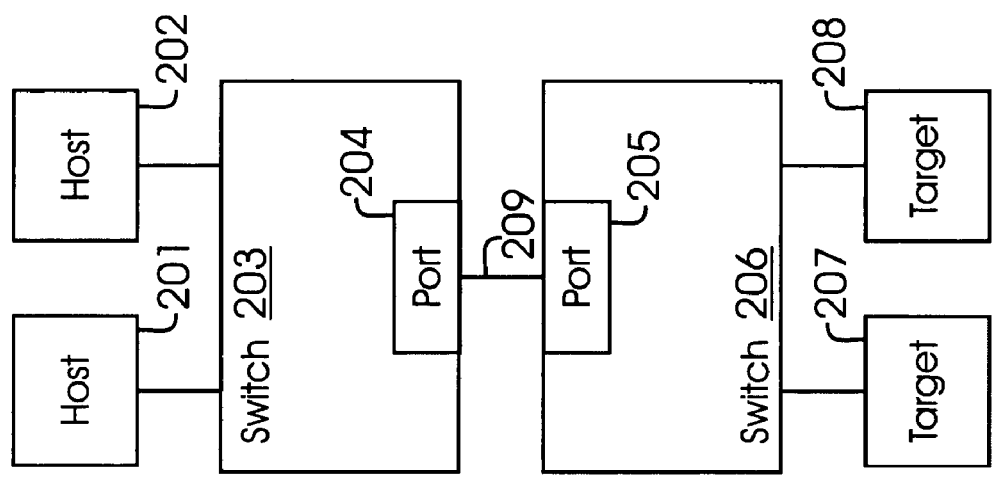

Turning back to the example in FIG. 2, credit-limiting feature can be used for port 204 to improve performance. QOS register 512 in port 204 for source port 202 can be set to 7, while the QOS register 512 at port 204 from source port 201 can be set to zero. This will result in twice as many frames being sent from host 201 as from host 202 (with the slow destination, target 208). Hence frames for target 208 will arrive at port 205 at a slow enough rate that they can be sent to the destination as fast as they arrive. This will allow link 209 to operate at full speed.

Although the present invention has been described with reference to specific embodiments, these embodiments are illustrative only and not limiting. Many other applications and embodiments of the present invention will be apparent in light of this disclosure and the following claims.

What is claimed is:

1. A method for controlling routing of fibre channel frames by a fibre channel switch element having a transmit segment with a plurality of queues for transmitting frames and a receive segment for receiving frames, comprising:

(a) setting a first threshold value to control frame transmission from the plurality of queues of the transmit segment of a port of the fibre channel switch; wherein the first threshold value includes a number of primitives (R_RDYs) that a queue from among the plurality of queues of the transmit segment has to receive before the queue is permitted to transmit a frame; the number of primitives (R_RDYs) indicating available credit at a receive segment of a destination port;

(b) enabling a credit limiting feature by counting a number of credits that are outstanding for the port at any given time and comparing if the number of outstanding credits is greater than or equal to a second threshold value; wherein the credit limiting feature is set to limit frame transmission from the queue of the transmit segment even when the transmit segment has available credit to transmit an available frame;

(c) incrementing a first counter value used for counting a number of R_RDYs that is received after a frame departs from the queue of the transmit segment;

(d) comparing the first counter value with the first threshold value;

(e) transmitting a frame from the queue of transmit segment when the first counter value is equal to or greater than the first threshold value indicating that the queue has received a certain number of R_RDYs from the receive segment of the destination port; and (f) when the credit limiting feature is enabled in step (b), blocking frame transmission from the queue of the transmit segment if the first counter value is less than the first threshold value, indicating that the queue of the transmit segment has to wait and receive more R_RDYs to match the first threshold value.

2. The method of claim 1, wherein a credit counter value is compared to the second threshold value and the comparison is used to enable the credit-limiting feature.

3. The method of claim 2, wherein a second counter is incremented every time a frame departs and holds a maximum value based on the second threshold value.

4. The method of claim 3, wherein when the second counter is at the maximum value, a credit-limiting signal is used to enable the credit limiting feature by setting a control bit in a control register.

5. The method of claim 3, wherein the second counter is cleared at a programmed interval.

6. A method for controlling routing of fibre channel frames by a fibre channel switch element having a transmit segment with a plurality of queues for transmitting frames and a receive segment for receiving frames, comprising:

setting a first threshold value to control frame transmission from the plurality of queues of the transmit segment of a port of the fibre channel switch element; wherein the first threshold value includes a number of primitives (R_RDYs) that a queue of the transmit segment has to receive before the queue is permitted to transmit a frame; the number of primitives (R_RDYs) indicating available credit at a receive segment of a destination port;

enabling a credit limiting feature by counting a number of credits that are outstanding for the port at any given time and comparing if the number of outstanding credits is greater than or equal to a second threshold value; wherein the credit limiting feature is set to limit frame transmission from the queue of the transmit segment even when the transmit segment has available credit to transmit an available frame;

determining if the credit limiting feature is enabled;

incrementing a counter value after a R_RDY is received and after a frame departs the queue of the transmit segment;

comparing the counter value with the first threshold value;

transmitting a frame from the queue of transmit segment if the counter value is equal to or greater than the first threshold value; and when the credit limiting feature is enabled, blocking frame transmission from the queue of transmit segment if the counter value is less than the first threshold value, indicating that the queue of the transmit segment has to wait and receive more R_RDYs to match the threshold value.

7. The method of claim 6, wherein a control bit is set in a control register to enable and disable the credit limiting feature.

8. The method of claim 6, wherein the primitive for controlling frame transmission is a VC_RDY primitive, if virtual lanes are used by the fibre channel switch element.

9. The method of claim 6, wherein the first threshold value is programmed in a register for the port.

10. The method of claim 6, wherein the first threshold value is set to provide quality of service (QOS) to different source ports using the fibre channel switch element for routing fibre channel frames.

11. A fibre channel switch element having a plurality of queues for a transmit segment for transmitting fibre channel frames and a receive segment for receiving fibre channel frames, comprising:

logic for comparing if a credit value is greater than or equal to a first threshold value to enable a credit limiting feature; wherein the credit limiting feature is set to limit frame transmission from the plurality of queues of the transmit segment of the fibre channel switch element even when the transmit segment has available credit to transmit an available frame;

a first counter that receives a signal after a frame has departed from a queue of the plurality of queues of the transmit segment and maintains a maximum value for a certain duration that is based on a comparison of the credit counter value with the first threshold value;

logic for comparing a number of primitives (R_RDYs) received after a frame departs the queue of the transmit segment with a second threshold value; the number of primitives (R_RDYs) indicating available credit at a receive segment; and a blocking counter that generates a signal for blocking frame transmission based on the comparison of the number of R_RDYs that are received after a frame has departed with the second threshold value and when the credit limiting feature is enabled; wherein the second threshold value is set to control frame transmission from the queue of the transmit segment and the second threshold value indicates the number of R_RDYs that the queue of the transmit segment has to receive before the transmit segment is permitted to transmit a frame.

12. The switch element of claim 11, further comprising: logic for generating a credit limiting signal to set a control bit value in a control register that enables the credit limiting feature.

13. The switch element of claim 11, wherein the blocking counter maintains a count for a number of VC-RDYs that are received after a frame has departed, if virtual lanes are used by the fibre channel switch element.

14. The switch element of claim 11, wherein the signal to block frames is generated if the blocking counter value is less than the second threshold value indicating that the transmit segment has to wait and receive more R_RDYs before the transmit segment can send a frame.

15. The method of claim 2, wherein the threshold value is different for individual source ports.

16. The method of claim 6, wherein the threshold value is different for individual source ports.

17. The switch element of claim 11, wherein the threshold value is different for individual source ports.

18. A method, comprising:

setting a first threshold value to control frame transmission from a plurality of queues of a transmit segment of a port of switch; wherein the first threshold value is an indicator of an amount of available credit at a receive segment of a destination port that a queue from among the plurality of queues of the transmit segment has to have before the queue is permitted to transmit a frame;

enabling a credit limiting feature by counting a number of credits that are outstanding for the port at any given time and comparing if the number of outstanding credits is greater than or equal to a second threshold value; wherein the credit limiting feature is set to limit frame transmission from the queue of the transmit segment even when the transmit segment has available credit to transmit an available frame;

incrementing a first counter value used for counting a credit that is received after a frame departs from the queue of the transmit segment;

comparing the first counter value with the first threshold value;

transmitting a frame from the queue of transmit segment when the first counter value indicates that the queue has received enough credit from the receive segment of the destination port to match the first threshold value; and blocking frame transmission from the queue of the transmit segment with enabled credit limiting feature when the first counter value indicates that the queue of the transmit segment has to wait and receive more credit to match the first threshold value.

19. The method of claim 18, wherein a control bit is set in a control register to enable and disable the credit limiting feature.

20. A switch element having a plurality of ports, each port including a plurality of queues for a transmit segment for transmitting frames and a receive segment for receiving frames, comprising:

logic for comparing a number of credits received from a receive segment of a destination port after a frame departs from a queue of a transmit segment of a port with a first threshold value used to control frame transmission from the queue and indicates an amount of credit that the queue has to receive before it is permitted to transmit a frame;

logic for comparing if a credit counter value is greater than or equal to a second threshold value to enable a credit limiting feature used for limiting frame transmission from the queue of the transmit segment even when the transmit segment has available credit to transmit an available frame;

a first counter that receives a signal after a frame has departed from the queue of the transmit segment and maintains a maximum value for a certain duration that is based on a comparison of the credit counter value with the second threshold value; and a blocking counter that generates a signal for blocking frame transmission based on a comparison of a number of credits that are received after a frame has departed with the first threshold value and when the credit limiting feature is enabled.

21. The switch element of claim 20, further comprising: logic for generating a credit limiting signal to set a control bit value in a control register that enables and disables the credit limiting feature.

* * * * *